(12) United States Patent
Aston et al.

(10) Patent No.: US 8,708,044 B2
(45) Date of Patent: Apr. 29, 2014

(54) PROCESS FOR CONSOLIDATING SAND

(75) Inventors: Mark Shelton Aston, Middlesex (GB); Dana Aytkhozhina, Middlesex (GB); Ian Gray, Warwickshire (GB)

(73) Assignee: BP Exploration Operating Company Limited, Middlesex (GB)

( * ) Notice: Subject to any disclaimer, the term of this patent is extended or adjusted under 35 U.S.C. 154(b) by 355 days.

(21) Appl. No.: 12/734,958

(22) PCT Filed: Nov. 28, 2008

(86) PCT No.: PCT/GB2008/003976
§ 371 (c)(1),
(2), (4) Date: Sep. 23, 2010

(87) PCT Pub. No.: WO2009/071876
PCT Pub. Date: Jun. 11, 2009

(65) Prior Publication Data
US 2011/0017461 A1    Jan. 27, 2011

(30) Foreign Application Priority Data

Dec. 5, 2007 (EP) .................................... 07254709

(51) Int. Cl.
*E21B 33/13* (2006.01)
*E21B 43/26* (2006.01)

(52) U.S. Cl.
USPC ...................................... 166/292; 166/305.1

(58) Field of Classification Search
None
See application file for complete search history.

(56) References Cited

U.S. PATENT DOCUMENTS

| | | | | |
|---|---|---|---|---|
| 3,032,499 A * | 5/1962 | Brown | | 507/251 |
| 3,805,531 A * | 4/1974 | Kistner | | 405/264 |
| 6,046,295 A | 4/2000 | Frisch, Jr. et al. | | |
| 6,197,912 B1 | 3/2001 | Huang et al. | | |
| 6,439,309 B1 | 8/2002 | Matherly et al. | | |
| 6,642,309 B2 | 11/2003 | Komitsu et al. | | |
| 6,784,272 B2 | 8/2004 | Mack et al. | | |
| 6,844,413 B2 | 1/2005 | Roesler et al. | | |
| 2006/0124303 A1 | 6/2006 | Nguyen et al. | | |
| 2007/0204990 A1* | 9/2007 | Kotlar et al. | | 166/276 |

FOREIGN PATENT DOCUMENTS

| | | |
|---|---|---|
| GB | 2 419 614 | 5/2006 |
| GB | 2 422 857 | 8/2006 |
| WO | WO 2005/124099 | 12/2005 |
| WO | WO 2005/124100 | 12/2005 |

OTHER PUBLICATIONS

International Search Report for PCT/GB2008/003976, mailed Mar. 30, 2009.
Written Opinion of the International Searching Authority for PCT/GB2008/003976, mailed Mar. 30, 2009.
Cray Valley, "One-Component Moisture Curing Methoxysilane Sealants", Technical Paper: Methoxysilane Sealants, Cray Valley Ltd., Caerphilly, UK, 7 pages.
Specialchem, "Sealants for Construction Part III-2: Elastomeric, High Performances Sealants", (May 26, 2004), 9 pages.

* cited by examiner

*Primary Examiner* — Angela M DiTrani
(74) *Attorney, Agent, or Firm* — Nixon & Vanderhye P.C.

(57) ABSTRACT

Method of treating a subterranean hydrocarbon-bearing formation comprising unconsolidated or poorly consolidated particulates, by contacting the formation with a solution or a dispersion of an organosilane which is a silylated polymer of formula (I):

$$(RO)_{3-n}R_nSi\text{-}A\text{-}B\text{-}A\text{-}Si(OR)_{3-n}R_n \quad (I)$$

wherein each R is independently a substituted or unsubstituted, alkyl group having from 1 to 6 carbon atoms, or a —C(O)R group where R is as hereinbefore defined; n is 0, 1 or 2; each A is a divalent organic radical; and B is a poly(oxyalkylene) linking group, a polyurethane linking group, or a poly(meth)acrylate linking group wherein the poly(oxyalkylene) linking group or the polyurethane linking group has a number average molar mass in the range of 600 to 20,000 g mol$^{-1}$. The poly(meth)acrylate linking group has a number average molar mass in the range of 600 to 40,000 g mol$^{-1}$.

25 Claims, 3 Drawing Sheets

PROCESS FOR CONSOLIDATING SAND

This application is the U.S. national phase of International Application No. PCT/GB2008/003976 filed 28 Nov. 2008, which designated the U.S. and claims priority to EP Application No. 07254709.4 filed 5 Dec. 2007.

This invention relates to a method of maintaining or enhancing fluid flow through subterranean formations containing fine particulate matter, such as sand. In particular, the invention relates to the prevention or reduction of particulate migration in hydrocarbon-bearing formations. More particularly, the invention concerns the consolidation or strengthening of unconsolidated particulate materials, especially sand, in subterranean formations.

BACKGROUND OF THE INVENTION

When recovering hydrocarbons from subterranean formation containing particulate fines, such as silt sized or smaller particles, these particulates have a tendency to be displaced, for example, due to instability of the formation. Where a large volume of fluid is forced to flow through such a formation, the very fine particles (especially sand) may be transported to the surface and must then be disposed of. Disposal of large volumes of sand produced from unconsolidated or poorly consolidated formations presents serious problems in terms of the logistics of disposal. Erosion of downhole equipments such as tubulars, sandscreens, pumps, or valves owing to the high velocities of particulates, especially sand particles, can also occur. Repair or replacement of such equipment can only be carried out during period of shut-down in production. Fine particulates can also become lodged in the pores of the formation, in particular, the pore throats in an intergranular rock (the small pore space at the point where two grains of an intergranular formation meet, which connects two larger pore volumes). This at least partially plugs the pores of the formation thereby causing a reduction in permeability of the formation and hence a reduction in the rate of hydrocarbon production.

The production and movement of fine particulates, especially sand particles, is a major problem in the operation of hydrocarbon production wells, particularly those that penetrate unconsolidated formations. Loss of production may arise owing to plugging of gravel packs, sand screens, perforations, tubulars, surface flow lines or separators. In addition to damaging pumps or other downhole equipment, erosion of casing, tubulars, downhole equipment and equipment in surface facilities may also occur. This erosion can in some cases cause loss of a well owing to hole collapse or may require re-completion of the well (replacement of casing, tubulars and downhole equipment). Accordingly, there is a need for effective sand control.

US 2006/124303, for example, relates to a method of treating a subterranean formation which involves treating low quality particulates by providing to them coatings of first and second curable resins. Said particulates may then be injected into the subterranean formation where they are said to able to rebond and provide adequate consolidation strength for formation of a stationary, permeable particulate pack, such as a gravel pack.

Although gravel packs can provide some stabilisation for subterranean formations, there is a need for more direct chemical stabilisation of the fine particulate matter in the formation. For this purpose, chemical treatments have been proposed which involve strengthening a formation by injecting a chemical that bonds fine particulates together thereby preventing or reducing the production and movement of fine particles when the well is in production. However, such chemical treatments should avoid blocking the pores of the formation.

UK Patent number GB 2419614B, for example, describes a method for the treatment of a subterranean formation which contains sand particles, said method comprising contacting said formation with a material capable of increasing the residual matrix strength of said sand particles whereby to reduce or prevent their migration whilst said material, on contact with said formation effects a reduction in permeability of less than 40%, wherein said material comprises a compound of formula:

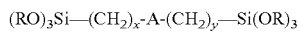

$(RO)_3Si-(CH_2)_x-A-(CH_2)_y-Si(OR)_3$ wherein each R is independently a substituted or unsubstituted alkyl group having 1 to 18 carbon atoms, or a —COR group wherein R is as hereinbefore defined; A is an organic linking group or a group comprising an atom having a lone pair of electrons; x is 0 or a positive integer; and y is 0 or a positive integer. According to GB 2419614B bridging will, typically occur between surfaces of particles which are separated by up to 30 bond lengths, preferably 15-20 bonds lengths, e.g. on grain-to-grain contact. In this way, the residual matrix strength of the formation is increased. It is also said that the function of the group A is as a linking group and its precise chemical nature is of lesser importance provided this function is fulfilled. Generally, however it will comprise a chain 1 to 20 atoms long, preferably 1 to 10, especially 1 to 5. Thus, GB 2419614B teaches away from using polymeric linking groups. Also, although examples, of suitable linking groups are said to include both linear and branched alkylene chains which may be interrupted by heteroatoms such as nitrogen and oxygen, there is no specific disclosure of the use of either poly(oxyalkylenes) or polyurethanes as linking groups.

SUMMARY OF THE INVENTION

According to the present invention there is provided a method of treating a subterranean hydrocarbon-bearing formation comprising unconsolidated or poorly consolidated particulates, the method comprising contacting the formation with a solution or a dispersion of an organosilane characterised in that the organosilane is a silylated polymer of formula (I):

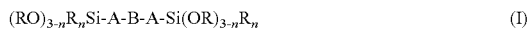

$(RO)_{3-n}R_nSi-A-B-A-Si(OR)_{3-n}R_n$ (I)

wherein each R is independently a substituted or unsubstituted, preferably unsubstituted, alkyl group having from 1 to 6 carbon atoms, preferably, 1 to 3 carbon atoms, or a —C(O)R group where R is as hereinbefore defined;

n is 0, 1 or 2;

each A is a divalent organic radical, for example, an alkoxy linking group such as propoxy; and B is a poly(oxyalkylene) linking group, a polyurethane linking group, or a poly(meth)acrylate linking group wherein the poly(oxyalkylene) linking group or the polyurethane linking group has a number average molar mass in the range of 600 to 20,000 g mol$^{-1}$, and the poly(meth)acrylate linking group has a number average molar mass in the range of 600 to 40,000 g mol$^{-1}$.

An advantage of the present invention is that the organosilane is capable of increasing the residual matrix strength of the particulates thereby reducing or preventing their migration from the formation. A further advantage is that the treated (consolidated) matrix has a high degree of flexibility. A further advantage of the present invention is that the consolidated formation maintains its permeability.

The term "particulates" is used herein to mean the grains of the formation rock that is to be, consolidated using the method of the present invention. Typically, the particulates have a mean particle diameter of less than 1 mm, for example, less than 50 µm. Many different materials can be found in subterranean formations and thus the composition of the particulates may vary widely. In general, the particulates may include quartz and other minerals, clays, and siliceous materials such as sand. The methods and compositions described herein find particular use in treating sandstone formations, i.e. sand particles.

The term "residual matrix strength" is a measure of the ability of the particulate matrix to hold together the individual particles under a given set of conditions (e.g. temperature, pressure, or fluid flow). The residual matrix strength of a matrix may be quantified in several ways, for example, in terms of the applied force, pressure, or fluid velocity required to destroy or break the matrix.

The organosilanes suitable for use in, accordance with the present invention are those that are capable of imparting a relatively weak residual matrix strength to the sand particles contained within a formation, for example, a residual matrix strength of 0.1 to 300 bar.

The person skilled in the art will understand that mixtures of organosilanes of general formula (I) may be used for consolidating the formation.

As used herein, the term "permeability" means the capacity of a porous medium (e.g. the particulate matrix) to transmit a fluid, i.e. the resistance to flow of a liquid through a porous material. Permeability is measured using Darcy's Law:

$$Q = k \cdot \Delta P \cdot A / \mu L$$

where
Q=flow rate ($cm^3/s$)
ΔP=pressure drop (atm) across a cylinder having a length L (cm) and a cross-sectional area A ($cm^2$)=
µ=fluid viscosity (cp)
k=permeability (Darcy).

The reduction in permeability following treatment in accordance with the present invention is less than 40%, preferably, less than 30%, more preferably less than 20%, for example, less than 10%. It is preferred that the formation has substantially the same permeability both before and after treatment.

Particularly preferred for use in the present invention are organosilanes that increase the residual matrix strength of the particulates by 20 to 1,000%, preferably 100 to 200%.

It is also preferred that the organosilanes for use in the invention afford a particulate matrix which is resilient, for example, it has high compressive, tensile and bond strengths. Preferably, the particulate matrix should have sufficient resiliency to withstand the stress conditions resulting from high fluid pressures and/or temperatures within the formation, for example, during fluid injection or fluid production. In particular, the matrix should be able to withstand a pressure pulse of at least 10,000 mbar, preferably at least 50,000 mbar substantially without loss of its structure.

The amount of particulates produced from a rock formation on exposure to a fluid at a given velocity may be expressed as a percentage of the original mass of the formation. Organosilanes suitable for use in accordance with the invention are those which are capable of minimising the production of particulates, for example, sand particles, and will generally maintain the level of production of particulates (% of total original mass) below 10%, for example, below 8%, at a Darcy flow rate (Darcy velocity) of 0.3 cm/s, preferably, within the range of 1 to 4%, for example, 1 to 2% at a Darcy velocity of 0.3 cm/s. The percentage sand production after consolidation can be readily determined using standard techniques that are well known to the person skilled in the art.

The organosilane compounds of formula (I) have hydrolysable bonds. The hydrolysable bonds that are present in the organosilane compounds may be different, but more preferably are the same. By a hydrolysable bond is meant a bond that is capable of being broken upon reaction with water. The hydrolysable bonds are attached to the silicon atoms of the terminal silyl groups (i.e. the bonds between the Si atoms and the OR functional groups) and hydrolyse to produce silanol (Si—OH) functional groups. The silanol groups are then believed to react with active sites (for example, hydroxyl groups on the surface of the particulates) and/or condense with other silanol functional groups by forming —Si—O—Si bonds. The reaction of the silanol groups with active sites on the particulates serves to covalently bond the organosilane to the particulates. However, the condensation of the silanol groups enables the organosilanes to covalently bond to each other. Bonds may form between different organosilane molecules bound to the same particles and/or different particles. The organosilane therefore binds and holds together the particles comprising the formation, thereby reducing or eliminating their movement when fluid flows through the formation.

Preferably, the polymeric linking group, B, is linear. Accordingly, the organosilane compound of formula (I) is bifunctional (having two terminal silyl groups). However, it is envisaged that the polymeric linking group, B, may have at least one branched chain having a terminal silyl group, —Si(OR)$_m$R$_n$, where R, m and n are as hereinbefore defined. Where the polymeric linking group, B, is branched, it is preferred that there are 1 to 4 branched chains, more preferably 1 to 2 branched chains that each have a terminal silyl group, —Si(OR)$_m$R$_n$ where R, m and n are as hereinbefore defined. Such organosilane compounds of formula (I) are multifunctional having at least 3 terminal silyl groups, preferably, 3 to 6, more preferably, 3 or 4 terminal silyl groups.

Thus, the organosilane compounds of formula (I) have a plurality of terminal silyl groups, each of which has at least one hydrolysable bond, preferably at least two hydrolysable bonds, and optionally, three hydrolysable bonds. Upon contact with water, the terminal silyl groups of the organosilanes of formula (I) each provide at least one, preferably at least two, and optionally three —Si—OH groups, which may undergo any of the above described reactions either with the particulates present in the formation and/or another organosilane. Thus, the preferred bifunctional organosilane compounds of formula (I) comprise 2 to 6, preferably 3 to 6 hydrolysable bonds.

The organosilanes of formula (I) are organosilane alkoxides, or organosilane esters where the terminal groups contain at least one —Si—OR or —SiO(O)CR group respectively (wherein R is a $C_1$ to $C_6$ alkyl, preferably a $C_1$ to $C_3$ alkyl, in particular, methyl or ethyl). These undergo hydrolysis to yield, in addition to silanol groups (i.e. —Si—OH), alkanols (R—OH) and carboxylic acids (RC(O)OH) respectively. Neither the alkanols (for example, methanol, ethanol, n-propanol, or iso-propanol) nor the carboxylic acids (for example, methanoic acid, ethanoic acid n-propionic acid or iso-propionic acid) are likely to cause problems in the consolidated formation or the production well.

The function of polymeric group, B, is as a linking group. Preferably, the polymeric linking group, B, is a poly(oxyalkylene) homopolymer or a poly(oxyalkylene) copolymer that may be branched or unbranched, preferably unbranched. Suitably, the poly(oxyalkylene) is selected from the group consisting of poly(oxyethylene) homopolymers, poly(oxypropylene) homopolymers, poly(oxytetramethylene) homopolymers, copolymers of ethylene oxide and propylene oxide, copolymers of ethylene oxide and butylene oxide, copolymers of ethylene oxide and propylene oxide, copolymers of ethylene oxide and butylene oxide, copolymers of propylene oxide and butylene oxide, and copolymers of ethylene oxide, propylene oxide and butylene oxide. The copolymers may be random copolymers or block copolymers.

Hydrosilylated poly(oxyalkylene) polymers of formula (II) may be prepared by hydrosilylation of allyl terminated or methallyl terminated poly(oxyalkylene) polymers in the presence of a catalyst, for example, hexachloroplatinic acid, as is well known in the art of polymerisation. For example, triethoxysilyl terminated poly(oxypropylene) may be prepared from a hydroxyl-terminated poly(oxypropylene) using the reactions shown below:

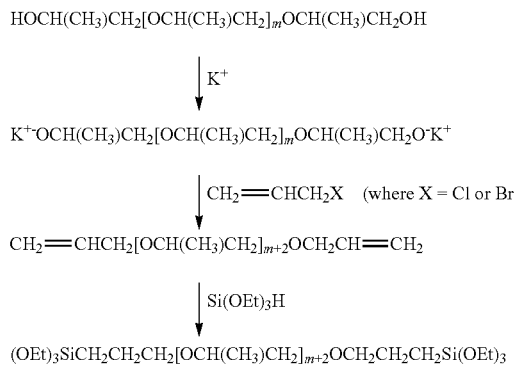

The person skilled in the art will understand that the allyl halide ($CH_2$=$CHCH_2X$) may be replaced by a methallyl halide ($CH_2$=$C(CH_3)CH_2X$). Also, the nature of the silylated end groups may be varied by varying the silane employed in the hydrosilylation step. Thus, the silane may be of general formula $Si(OR)_nR_mH$ where R, n and m are as previously defined for formula (I). Also, the nature of the polymeric linking group may be varied by using a different hydroxyl-terminated poly(alkylene oxide) polymer as the starting material.

Accordingly, the hydrosilylated poly(oxyalkylene) polymers are of general formula (II):

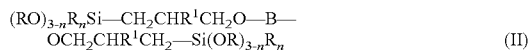

where R, and n are as hereinbefore defined for formula (I), $R^1$ is independently selected from H or methyl and B is a poly (oxyalkylene oxide) linking group. R is preferably methyl, and n is preferably 0 or 1. Most preferred hydrosilylated poly(oxyalkylene) polymers are hydrosilylated poly(oxypropylene) polymers, most especially trimethoxysilyl-terminated polyoxypropylene and methyldimethoxysilyl-terminated polyoxypropylene. Suitable hydrosilylated poly(oxyalkylene) polymers include Kaneka MS Polymer™ and Kaneka Silyl Polymer™ (ex Kaneka Corporation of Japan).

Preferably, the hydroxyl-terminated poly(alkylene oxide) polymer that is used for the preparation of the hydrosilylated poly(oxyalkylene) polymer of formula (II) has a number average molar mass in the range of 600 to 20,000 g mol$^{-1}$, preferably, 2,000 to 17,500 g mol$^{-1}$, more preferably 5,000 to 15,000 g mol$^{-1}$, in particular, 7,500 to 12,500 g mol$^{-1}$, for example, about 10,000 g mol$^{-1}$.

The polymeric linking group, B, may also be a linear polyurethane linking group. Thus, the organosilane of formula (I) may be a silyl terminated linear polyurethane. Typically, the silyl terminated linear polyurethane is formed by reaction of an isocyanate terminated polyurethane prepolymer with an isocyanate-reactive silane compound. Generally, the isocyanate terminated polyurethane prepolymer is prepared by reaction of a hydroxyl-terminated poly(oxyalkylene) with an aliphatic diisocyanate or an aromatic diisocyanate ("poly (oxyalkylene) based polyurethane linking group"). Suitable hydroxyl terminated poly(oxyalkylenes) for use in the preparation of the polyurethane prepolymer include those described above in relation to the preparation of hydrosilylated poly(oxyalkylene) polymers of formula (II). Suitable aliphatic diisocyanates for use in the preparation of polyurethane prepolymer include isophorone diisocyanate and hexamethylene diisocyanate. Suitable aromatic diisocyanates include methylene diphenyl diisocyanate and toluene diisocyanate. Accordingly, the isocyanate terminated polyurethane prepolymer may be represented by formula (III):

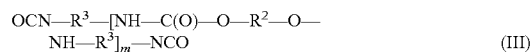

where $R^2$ presents a poly(oxyalkylene) radical, $R^3$ is the residue of a diisocyanate and m is an integer of from 1 to 10, preferably, 1 to 5, for example, 1 to 3.

The isocyanate terminated prepolymer may then be reacted with an isocyanate reactive silane compound, preferably, an isocyanate reactive silane compound of formula (IV):

where R and n are as previously defined for formula (I), $R^4$ is a divalent saturated organic bridging radical of 2 to 20 carbon atoms that is free from isocyanate groups and Z is an isocyanate reactive group such as those selected from the group consisting of —OH, —SH, —NHR$^5$, —NH$_2$, —N(C$_2$H$_4$OH)$_2$, and other active hydrogen terminated compounds (wherein $R^5$ is selected from the group consisting of phenyl, straight or branched aliphatic groups comprising from about 1 to about 12 carbon atoms, and cycloaliphatic groups).

Representative divalent alkylene radicals ($R^4$) include but are not limited to those selected from the group consisting of —CH$_2$CH$_2$—, —CH$_2$CH$_2$CH$_2$—, —CH$_2$CH$_2$OCH$_2$CH$_2$—, —CH$_2$CH$_2$CH$_2$OCH$_2$CH$_2$—, —CH(CH$_3$)CH$_2$OCH(CH$_3$)CH$_2$— and —CH$_2$CH$_2$C$_6$H$_4$-CH$_2$CH$_2$—.

Preferably, the isocyanate terminated polyurethane prepolymer that is used in the preparation of the silyl terminated polyurethane has a number average molar mass in the range of 600 to 20,000 g mol$^{-1}$, preferably, 2,000 to 17,500 g mol$^{-1}$, more preferably 5,000 to 15,000 g mol$^{-1}$, in particular, 7,500 to 12,500 g mol$^{-1}$, for example, about 10,000 g mol$^{-1}$.

The polymeric linking group may also be a linear poly (meth)acrylate polymer having structural units derived from acrylate monomers and/or methacrylate monomers. Thus, the organosilane of formula (I) may be a silyl terminated linear polymer of formula (V):

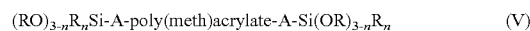

wherein R, n and A are as hereinbefore defined. The polymeric linking group may be a polyacrylate polymer, a polymethacrylate polymer or a polymer having units derived from both acrylate and methacrylate monomers. Preferably, the silylated poly(meth)acrylate polymer has a sufficiently low glass transition temperature, $T_g$, that the polymer is rubbery or flexible over a temperature range of −20 to +40° C. Typically, the silylated polymer has a Tg of about −50° C., for example, −40 to −60° C. The polyacrylate linking group is derived from at least one monomer of formula $CH_2$=CHC(O)OR$^6$ where R$^6$ is preferably methyl, ethyl, n-propyl, iso-propyl, n-butyl, iso-butyl, tert-butyl, pentyl, or hexyl. The polyacrylate linking group may be a homopolymer, in particular, poly(propyl acrylate) or poly(butyl acrylate). Alternatively, the polyacrylate linking group may be a copolymer comprising units derived from at least two acrylate monomers, for example, a copolymer of ethyl acrylate, propyl acrylate and butyl acrylate. The polymethacrylate linking group may be derived from at least one monomer of formula $CH_2$=C(CH$_3$)C(O)OR$^7$ where R$^7$ is a long chain alkyl group having a chain length of at least 8 carbon atoms, preferably, at least 10 carbon atoms, for example, a chain length of 12 to 16 carbon atoms. The linking group may also be a polymer having units derived from at least one acrylate monomer of formula CH=CHC(O)OR$^6$ and at least one methacrylate monomer of formula $CH_2$=C(CH$_3$)C(O)OR$^8$ where R$^8$ is an alkyl group having a chain length of 1 to 16 carbon atoms.

Preferably, the poly(meth)acrylate polymer that is used in the preparation of the silyl terminated poly(meth)acrylate polymer has a number average molar mass in the range of 600 to 40,000 g mol$^{-1}$, preferably, 2,000 to 30,000 g mol$^{-1}$, more preferably 5,000 to 20,000 g in particular, 7,500 to 15,000 g mol$^{-1}$, for example, about 10,000 g mol$^{-1}$.

The organosilanes of formula (I) for use in the present invention are generally liquids (prior to hydrolysis) and have low toxicity, volatility and flammability. It is preferred to use the organosilane in the form of a treatment composition comprising a solution or dispersion of the organosilane in an organic carrier fluid. Accordingly, the organosilane should be either dispersible or soluble in the organic carrier fluid. Suitable organic carrier fluids include oils such as crude oil or base oil, aliphatic hydrocarbons such as hexane, aromatic hydrocarbons such as toluene and benzene and petroleum distillate fractions such as kerosene, naphtha and diesel. The organic carrier fluid minimises the exposure of the organosilane to water during its passage down the production well to the formation that is to be consolidated using the method of the present invention. Preferably, the organic carrier fluid is substantially anhydrous. By substantially anhydrous is meant that the organic carrier fluid contains less than 5% wt water, preferably, less than 2% wt water, still more preferably less than 1% wt water, for example, less than 0.5% wt water or less than 0.1% wt water.

Optionally, the organic carrier fluid may comprise a dehydrating agent to prevent premature hydrolysis of the hydrolysable bonds of the organosilane. Suitable, dehydrating agents include Dynasylan™ VTMO (vinyltrimethoxysilane), ex Degussa. Suitably, the concentration of the dehydrating agent in the treatment composition is in the range 0.05 to 5 wt %, preferably, 0.1 to 1 wt %.

Optionally, the organic carrier fluid may comprise an adhesion promoter. Typically, the adhesion promoter is an aminoorganosilane of formula (VI):

(RO)$_{3-n}$R$_n$Si—R$^9$—NR$^{10}$R$^{11}$     (VI)

wherein R and n are as previously defined for formula (I); R$^9$ may be selected from —(CH$_2$)$_x$— where x is an integer of from 1 to 20, preferably 1 to 8, or may be —(CH$_2$)$_y$NH(CH$_2$)$_z$— where y is an integer of from 1 to 10, preferably, 2 to 4 and z is an integer of from 1 to 10, preferably, 2 to 4; and R$^{10}$ and R$^{11}$ are independently selected from hydrogen and a substituted or unsubstituted alkyl group having from 1 to 6 carbon atoms, preferably 1 to 3 carbon atoms. Preferably, at least one of R$^{10}$ and R$^{11}$ is hydrogen. More preferably, both R$^{10}$ and R$^{11}$ are hydrogen.

Examples, of aminoorganosilanes of formula (VI) include N-(n-butyl)-3-aminopropyltrimethoxysilane, N-(2-aminoethyl)-3-aminopropyltrimethoxysilane, N-(2-aminoethyl)-3-aminopropylmethyldimethoxysilane, and 3-aminopropylmethyldiethoxysilane, 3-aminopropyltriethoxysilane, and 3-aminopropyltrimethoxysilane. Such compounds are available commercially, for example, from Degussa (Hanau, Germany) under the tradenames DYNASYLAN® 1189, DYNASYLAN® DAMO-T, DYNASYLAN® 1411, DYNASYLAN® 1505, DYNASYLAN® 1506, DYNASYLAN® AMEO and DYNASYLAN® AMMO.

Preferably, the treatment composition comprises a catalyst that is used to accelerate the rate of hydrolysis of the hydrolysable bonds upon contact with the connate water in the formation. Suitable catalysts may be of the organotin type or may be non-organotin type, including inorganic tin catalysts, and organic acids, organic acid metal salts, amine compounds, Group 3B or Group 4A metal compounds or combinations thereof.

Examples of organotin catalysts which may be suitable include dialkyltin compounds, especially dibutyl tin compounds and, most preferably, dioctyl tin compounds. Particular examples which may be utilised are dialkyltin dicarboxylates, such as dibutyltin dilaurate, dibutyltin bis(alkyl maleate), dioctyltin dilaurate and dioctyltin bis(alkyl maleate); dialkyltin alkoxide derivatives such as dibutyltin dimethoxide, dibutyltin diphenoxide, dioctyltin dimethoxide and dioctyltin diphenoxide; intramolecular coordination derivatives of dialkyltins, such as dibutyltin diacetylacetonate, dibutyltin acetoacetate, dioctyltin diacetylacetonate and dioctyltin acetoacetate; reaction mixtures of dialkyltin oxide with ester compounds; reaction mixtures of dialkyltin oxide with silicate compounds, and tetravalent dialkyltin oxide derivatives such as oxy derivatives of said dialkyltin oxide derivatives.

Preferred tin catalysts are dialkyltin diacetylacetonate, dialkyltin dilaurate and dialkyltin diketonate. A particularly preferred catalyst consists of NEOSTANN S-1 (the silicicacid, tetraethylester reaction products with bis(acetyloxy) dioctylstannane (sold by Nitto Kasei Co. Ltd., Japan).

It should be noted that organotin catalysts can present HSE concerns in certain uses. Dioctyltin compounds generally present less concern and are therefore preferable to dibutyltin compounds for this reason. In other situations catalysts that don't include tin at all may be required or preferred to satisfy HSE requirements.

Suitable organic acids are organic carboxylic acids, organic sulfonic acids and acidic phosphate esters, among others. Suitable organic carboxylic acids include aliphatic carboxylic acids, such as acetic acid, oxalic acid, butyric acid, tartaric acid, maleic acid, octylic acid, neodecanoic acid and oleic acid; and aromatic carboxylic acids such as phthalic acid, trimellitic acid. Aliphatic carboxylic acids are preferred.

Suitable organic sulfonic acids include toluenesulfonic acid and styrenesulfonic acid.

Suitable acidic phosphate esters are phosphoric acid esters containing an —O—P(—O)OH moiety. Organic acidic phosphate compounds are preferred. Organic acidic phosphate esters may be represented by the formula (R—O)$_d$—P(—O)(—OH)$_{3-d}$ (wherein d is equal to 1 or 2; R represents an organic residue). Suitable compounds include: (CH$_3$O)$_2$—P(—O)(—OH), (CH$_3$O)—P(—O)(—OH)$_2$, (C$_2$H$_5$O)$_2$—P(—O)(—OH), (C$_2$H$_5$O)—P(—O)(—OH)$_2$, (C$_3$H$_7$O)$_2$—P(—O)(—OH), (C$_3$H$_7$O)—P(—O)(—OH)$_2$, (C$_4$H$_9$O)$_2$—P(—O)(—OH), (C$_4$H$_9$O)—P(—O)(—OH)$_2$, (C$_8$H$_{17}$O)$_2$—P(—O)(—OH), (C$_8$H$_{17}$O)—P(—O)(—OH)$_2$, (C$_{10}$H$_{21}$O)$_2$—P(—O)(—OH), (C$_{10}$H$_{21}$O)—P(—O)(—OH)$_2$, (C$_{13}$H$_{27}$O)$_2$—P(—

O)(—OH)(C$_{13}$H$_{27}$O)—P(—O)(—OH)$_2$, (C$_{16}$H$_{33}$O)$_2$—P(—O)(—OH), (C$_{16}$H$_{33}$O)—P(—O)(—OH)$_2$, (HO—C$_6$H$_{12}$O)$_2$—P(—O)(—OH), (HO—C$_6$H$_{12}$O)—P(—O)(—OH)$_2$, (HO—C$_8$H$_{16}$O)$_2$—P(—O)(—OH), (HO—C$_8$H$_{16}$O)—P(—O)(—OH)$_2$, {(CH$_2$OH)(CHOH)O}$_2$—P(—O)(—OH), {(CH$_2$OH)(CHOH)O}—P(—O)(—OH)$_2$, {(CH$_2$OH)(CHOH)C$_2$H$_4$O}$_2$—P(—O)(—OH), {(CH$_2$OH)(CHOH)C$_2$H$_4$O}—P(—O)(—OH)$_2$.

Suitable amine compounds include butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5.4.0]undecene-7 (DBU).

The use of an organic acid compound in combination with an amine compound is, particularly preferred. Among various combinations of organic acid compounds with amines, the preferred are the combination of an acidic phosphate ester with an amine and the combination of an organic carboxylic acid with an amine.

The carboxylates of metals other than tin that may be used include calcium carboxylates, zirconium carboxylates, iron carboxylates, vanadium carboxylates, bismuth carboxylates, lead carboxylates, titanium carboxylates, nickel carboxylates. Preferred carboxylic acid moieties for said compounds include octylic acid, oleic acid, naphthenic acid and stearic acid. The use of such a metal carboxylate in combination with an amine is particularly preferred.

As catalysts containing Group 3B or 4A metals there may be considered in particular organotitanate compounds, organoaluminium compounds, organozirconium compounds, organoboron compounds. Suitable organotitanate compounds include tetraisopropyl titanate, tetrabutyl titanate, tetramethyl titanate, tetra-2-ethylhexyl titanate, titanium alkoxides such as triethanolamine titanate; titanium chelate compounds, such as titanium tetraacetylacetonate, titanium ethylacetoacetate, octylene glycol titanate ester, titanium lactate. Suitable organoaluminium compounds include aluminium alkoxides such as aluminium isopropoxide, mono-sec-butoxyaluminium diisopropoxide, and aluminium sec-butoxide, and aluminium chelate compounds, such as aluminium tris(acetylacetonate), aluminium tris(ethyl acetoacetate) and diisopropoxyaluminium ethylacetoacetate. Suitable organozirconium compounds include zirconium alkoxides such as zirconium tetraisopropoxide, zirconium tetra-n-propoxide and zirconium n-butoxide; and zirconium chelate compounds, such as zirconium tetraacetylacetonate, zirconium monoacetylacetonate, zirconium bisacetylacetonate, zirconium acetylacetonato-bis-etylacetoacetate and zirconium acetate. Use of these compounds in combination with an amine compound or acidic phosphate ester compound is preferred.

The amount of catalyst to be used can be selected according to the intended use and expected performance, but, typically, the concentration of the catalyst in solution or dispersion is in the range of 0.01 to 2 wt %, preferably 0.1 to 0.5 wt %.

The organosilanes for use in the present invention (the multifunctional organosilane of formula (I) and the optional aminoorganosilane of formula (VI)) are either at least partially soluble in water or react at an oil/water interface. This allows the organosilane(s) to be delivered to the formation in an organic carrier fluid whilst enabling the organosilane(s) to undergo reaction on contact with connate water (water contained within the formation) at the desired location in the formation.

The amount of organosilane to be used (organosilane of formula (I) and optional aminoorganosilane of formula (VI)) will vary widely depending on factors such as the nature of the particular organosilane, the nature (for example, permeability, temperature etc) of the rock formation and so on. The average particle/grain size of the particulates will, for example, influence the strength of the matrix and thus the amount of organosilane needed to prevent or reduce particle migration. The amount of organosilane used should be sufficient to maintain the rate of flow of fluids through the formation following treatment and appropriate amounts may be readily determined by the person skilled in the art.

Preferably the amount of organosilane of formula (I) that is used for consolidating the formation is sufficient to coat a substantial portion of the particulates in the near wellbore region of the formation. The amount of organosilane of formula (I) is sufficient to function as a "bridge" between particles that are in close proximity to one another.

Typically the concentration of organosilane of formula (I) in the organic carrier fluid of the treatment composition is in the range of from 0.1 to 50% wt, preferably, 2 to 30% wt, more preferably, 5 to 20% wt. A higher volume of the treatment composition will be employed where it is necessary to treat a larger treatment zone (i.e., the composition is intended to penetrate deeper into the formation). Typically, about 300 to 3000 liters of hydrocarbon carrier fluid per m$^3$ of formation to be treated will be used.

Suitably, the concentration of the adhesion promoter of formula (VI) in the carrier fluid of the treatment composition is in the range 0.05 to 5 wt %, preferably, 0.2 to 2.5 wt 5, for example, 0.1 to 1 wt %.

Typically, the ratio of the multifunctional organosilane of formula (I) to the aminoorganosilane of formula (VI) in the treatment composition of the present invention is in the range of 80:20 to 99.8:0.2, more preferably 90:10 to 98:2.

The treatment of the formation with the organosilane may be prior to commencement of hydrocarbon production in order to mitigate against potential particulate migration. However, the treatment may also be after hydrocarbon production has begun in order to reduce particulate migration either prior to or during particulate production. The treatment method of the present invention may avoid the need for complex sand protection systems upon completion of the well. Instead, simple sand protection systems such as sandscreens may be employed. For existing wells where production is restricted by the Maximum Sand-Free rate (the maximum production rate where the well is not subject to sand production), treatment in accordance with the invention enables the use of much higher hydrocarbon production rates. Thus, the production well can tolerate a much higher differential pressure (higher draw down) without sand production.

Treatment is preferably carried out by injecting a treatment composition comprising the organosilane that is either dispersed or dissolved in a hydrocarbon carrier fluid into a formation via a production well at a pressure sufficient for the composition to enter the pores of a formation (commonly referred to as a "squeeze treatment"). The well is then shut-in for a period of time that is dependent upon factors such as the nature of the formation, the degree of consolidation required, the concentration of the organosilane in the treatment composition, the temperature of the formation, and the pressure of the formation. Typically, the production well is shut-in for 1 to 24 hours, preferably 2 to 10 hours, in particular, 3 to 6 hours. Thus, the "near wellbore region" of the formation is consolidated using a squeeze treatment. By "near wellbore region" of the formation is meant a region of the formation that extends several inches (for example, up to 30 inches) in a radial direction from the production well.

It is also envisaged that the treatment composition may be injected into an injection well thereby consolidating the near wellbore region of the injection well. Typically, the injection well is shut-in for a period of time, as described above for a production well.

Any conventional method may be used to supply the treatment composition to the production well. Such methods include bull-heading, the use of coiled tubing and zonal isolation with packers, preferably bull-heading. An advantage of bull-heading is that the whole well is treated at relatively low cost. Also, bull-heading may be used to treat both vertical and horizontal wells. Suitable injection flow rates for the treatment composition may be readily determined by the person skilled in the art and may be in the range of 150 to 3000 liters per minute, preferably, 500 to 2000 liters per minute.

The organic carrier fluid may also contain other additives known in the art for use in well treatments. Such additives include surfactants, thickeners, diversion agents, pH buffers, scale inhibitors, wax inhibitors, asphaltene inhibitors, hydrate inhibitors, or hydrogen sulfide scavengers.

Optionally, a pre-flush fluid is injected into the formation before the treatment composition. For example, if the formation contains excess water, the pre-flush may be an organic fluid such as kerosene, diesel or crude oil. The purpose of the pre-flush fluid is to displace a substantial proportion of the excess water from the pore space of the near wellbore region of the formation that is to be consolidated using the treatment composition. The pre-flush also removes any water present in the production wellbore (for example, in equipment, tubulars etc.). However, without wishing to be bound by any theory, it is believed that the pre-flush leaves behind water molecules that are adsorbed onto the surface of the formation particles via hydrogen bonding. This adsorbed water is often referred to a "residual water" or "irreducible water". If the formation is completely oil wet, a pre-flush fluid is used to clean the formation rock. Typically, the pre-flush fluid is a mutual solvent (for water and an organic fluid) such as ethylene glycol monobutyl ether (EGMBE). After pumping the mutual solvent into the formation rock, a brine is pumped into the formation followed by an organic fluid such as kerosene, diesel or crude oil, thereby establishing "irreducible" water. The effect of such pre-flush treatments is to provide a formation comprising 1 to 10% water, for example, 2 to 5% water of irreducible water.

When the formation is subsequently treated with the organosilane as hereinbefore defined (a multifunctional silane of formula (I) and optionally a monofunctional silane of formula (VI)) the only water that is present that can cause hydrolysis of the hydrolysable bonds of the organosilane is the film of water molecules that are adsorbed onto the surface of the formation particles. Accordingly, hydrolysis substantially only occurs in close vicinity to the formation particles and the silanol groups produced on hydrolysis of the Si—OR bonds preferentially react with active sites (e.g. —Si—OH groups) on the surface of the particles and/or other silanols nearby thereby "gluing" the particles together. In contrast, few silanols are produced in the pore spaces owing to the displacement of water therefrom and few silanols diffuse into the pore space from the surface of the particles. Thus, there is substantially no condensation of the organosilane molecules in or across the pore space which is therefore kept open. Accordingly, this minimises any decrease in the permeability of the formation as a result of the consolidation treatment.

Where the pre-flush fluid is an organic fluid, it is preferred that the organic fluid is substantially insoluble in water or is immiscible with water. Examples of suitable organic pre-flush fluids include crude oil, base oil, aliphatic hydrocarbons such as hexane, aromatic hydrocarbons such as toluene and benzene or a petroleum distillation product such as kerosene, naphtha or diesel. Preferably, the organic pre-flush fluid is diesel.

The pre-flush fluid (organic pre-flush fluid or mutual solvent pre-flush fluid) should be substantially dry. By "dry" is meant that the pre-flush fluid contains less than 10% wt water, preferably, less than 5% wt water, more preferably, less than 3% wt water, in particular, less than 1% wt water.

Typically, the volume of the pre-flush fluid is 1000 liters per $m^3$ of formation that is to be treated (i.e. 1 pore volume). Typically, the pre-flush fluid is introduced by injecting the pre-flush fluid into the formation at a flow rate of 2500-3000 liters per minute.

A post-flush fluid may optionally be employed (following injection of the treatment composition into the formation). This post-flush fluid displaces any unreacted organosilane from the wellbore. The same organic fluids that may be employed as a pre-flush fluid may be used as the post-flush fluid. It is preferred that the post-flush fluid comprises less than 10% water, preferably, less than 5% water, in particular, less than 3% water, for example, less than 1% water.

Thus, in a preferred embodiment of the present invention there is provided a method for treating a subterranean hydrocarbon-bearing formation comprising unconsolidated or poorly consolidated particles, the method comprising:

(A) injecting a pre-flush fluid into the formation via a production well or an injection well thereby displacing substantially all water from the pore space of the near wellbore region of the formation that is to be consolidated;

(B) injecting a treatment composition comprising an organosilane as hereinbefore defined either dissolved or dispersed in an organic carrier fluid into the near wellbore region of the formation via the production well or injection well;

(C) shutting in the well for a sufficient period of time for the organosilane to hydrolyse and consolidate the particles of the formation;

(D) optionally post-flushing the formation with a post-flush fluid.

As discussed above, the amount of treatment composition that is injected into the formation should be sufficient to consolidate at least the near wellbore region of the formation.

As an alternative to shutting in the well, after injection of a sufficient volume of the treatment composition to consolidate the near wellbore region of the formation, injection of the treatment composition may continue at a slower rate for a sufficient period of time for the organosilane to hydrolyse and consolidate the particles of the formation.

The treatment method of the present invention may be repeated periodically throughout the lifetime of a production well or injection well in order to maintain particulate free production or to minimise the amount of particulate production.

The method of the present invention may be employed to stabilise any poorly or unconsolidated formation. Such formations may contain a broad range of particulate fines that may comprise quartz or other minerals such as feldspars, muscovite, calcite, dolomite, barite, water-swellable clays such as montmorillonite, beidellite, nontronite, saponite, hectorite and sauconite, or non-water swellable clays such as kaolinite and illite.

Problems associated with the migration of fines are most pronounced in sandstone formations. Thus the particulate fines preferably comprise siliceous sand grains. Preferred formations comprise greater than 75% sand, more preferably greater than 85% sand, still more preferably greater than 95% sand. By sand is meant any material consisting essentially of silica ($SiO_2$).

The formations that are to be treated may be naturally occurring consolidations or artificial consolidations. By artificial consolidations is meant a formation that has been treated with other chemical agents, for example other consolidating agents.

The present invention will now be described by reference to the following Figures and Examples.

Materials

Silane modified polypropylene oxide (SMPPO)-based adhesive (Evostik "Serious Stuff"; ex Bostik Findley): an adhesive comprising a silane modified poly(propylene oxide) (SMPPO) polymer;

SMPPO polymers: Kaneka MS Polymer S303H (ex Kaneka BV (Belgium); this polymer grade is employed in the Evostik "Serious Stuff" adhesive); SAX260, SAX400, SAX520, SAX580 and SAT010 (all ex Kaneka BV (Belgium). (S303H and SAX260 are methyldimethoxysilyl-terminated polyoxypropylenes, and SAX520 and SAX580 are trimethoxysilyl-terminated polyoxypropylenes.)

Silane modified polyacrylate polymers (also referred to as telechelic polyacrylates or silyl-modified acrylates): SA-420S, SA-100S and OR-100S telechelic polyacrylate grades (ex Kaneka BV (Belgium)).

A blend of an SMPPO with an acrylic polymer: MAX923 (ex Kaneka BV (Belgium)).

Dehydrating agent: vinyltrimethoxysilane (VTMS; 98%, ex Sigma-Aldrich).

Catalysts:
(a) Organotin catalyst: Metatin™ Katalysator 740 (tin, dibutylbis(2,4-pentanedionate-O,O')—, (OC-6-11)-) (ex Rohm & Hass) and Neostann S-1 (silicic acid, tetraethylester reaction products with bis(acetyloxy)dioctylstannane (ex Nitto Kasei Co. Ltd., Japan),
(b) Inorganic tin catalysts: Neostann U-28, (ex Nitto Kasei Co., Ltd, Japan) and Metatin™ S26 (ex INTERATIO B.V., Netherlands),
(c) Organic acid catalysts: Neodecanoic acid (ex ABCR GmbH & Co. KG, Germany),
(d) Titanium metal catalyst: Tyzor PITA™ (bis(ethyl acatoacetato-O1', O3) bis(propan-2-olato) titanium), Tyzor Tot™ (mixture of 98% titanium tetrakis (2-ethylhexanolate) and 2% titanium tetraisopropanolate)(both ex DuPONT).

Adhesion promoters: (N-[3-(trimethoxysilyl)propyl]-ethylenediamine (tech., 80+%, ex Sigma-Aldrich) and 3-(glycidoxypropyl) trimethoxysilane (ex Sigma-Aldrich).

Sand: Garside 18/25 mesh (coarse) silica sand, Garside 16/30 mesh (coarse) silica sand and Garside No. 80 (fine) silica sand.

Kerosene: Clairsol 370 (ex Petroehem Carless).

Seawater: artificial seawater composition (ex BDH) comprising NaCl (26.5 WI), $MgCl_2$ (2.4 g/l), $MgSO_4$ (3.3 g/l), $CaCl_2$ (1.1 g/l), KCl (0.73 g/l), $NaHCO_3$ (0.2 g/l) and NaBr (0.28 g/l).

DEAPA (3-diethylamino-propylamine) and Laurylamine (ex Sigma-Aldrich).

BRIEF DESCRIPTION OF THE DRAWINGS

The invention is further described with reference to the accompanying drawings, in which.

EXAMPLES

Figure 1:
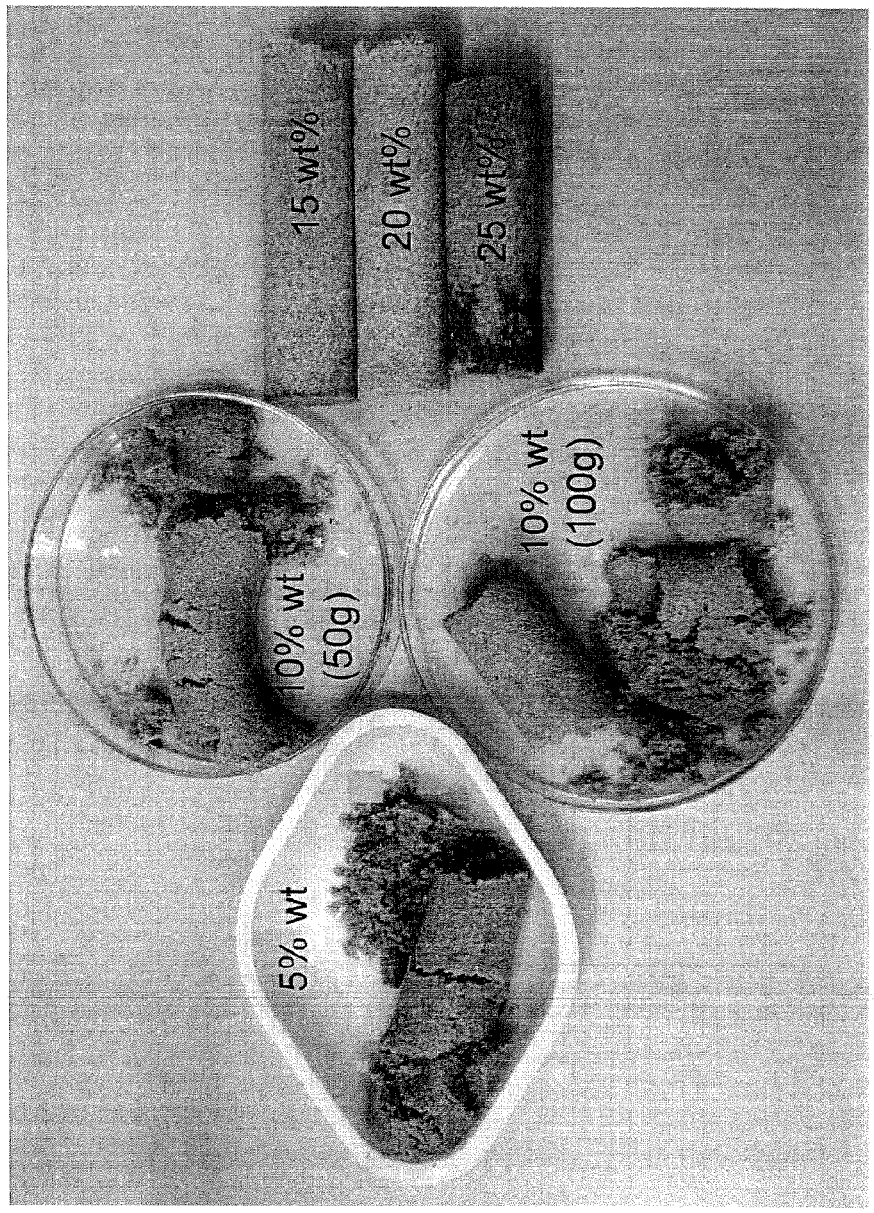
FIG. 1 illustrates consolidated sand that has been treated with 5% wt, 10% wt (50 g and 100 g), 15% wt, 20 wt % and 25 wt % dispersions of the adhesive in kerosene.

Solubility of SMPPO and Telechelic Polyacrylates in Kerosene and Acetone

The physical appearance of the various grades of polymer supplied by Kaneka BV (Belgium) was assessed together with the solubility of the polymers in kerosene and acetone. The qualitative results are presented below in Table 1.

TABLE 1

Solubility of Polymer Grades in Kerosene and Acetone

| Polymer Grade | Type | Appearance | Soluble in kerosene? | Soluble in acetone? |
|---|---|---|---|---|
| S303H | SMPPO | Clear, colourless, viscous liquid | Yes | Yes |
| SAX260 | SMPPO | Clear, colourless, viscous liquid | Yes | Not tested |
| SAX400 | SMPPO | Clear, colourless, viscous liquid | Yes | Yes |
| SAX520 | SMPPO | Clear, colourless, viscous liquid | Yes | Not tested |
| SAX580 | SMPPO | Clear, colourless, viscous liquid | Yes | Not tested |
| SAT010 | SMPPO | Clear, very pale straw-coloured, viscous liquid | Yes | Yes |
| MAX923 | Blend of SMPPO and acrylic polymer | Clear, colourless, viscous liquid | Partially: the solution was cloudy with telechelic polyacrylates precipitating over time | Yes |
| SA420S | Telechelic polyacrylates | Slightly cloudy, straw-coloured, very viscous liquid | Yes | Yes |
| SA100S | Telechelic polyacrylates | Clear, straw-coloured, extremely viscous liquid | No | Yes |
| OR100S | Telechelic polyacrylates | Clear, straw-coloured, extremely viscous liquid | No | Yes |

Sand Consolidation Experiments Using the SMPPO-Based Adhesive ("Serious Stuff")

Dispersions of the SMPPO-based adhesive were prepared in kerosene with adhesive concentrations of 5, 10, 15, 20, 25 and 50 wt %. These dispersions were used to consolidate water-wet sand.

Experimental Procedure

1. Garside 18/25 mesh (coarse) silica sand (50 ml) was placed in a sandpack and sufficient deionised water was passed through the sand, at a flow rate of 20 ml min$^{-1}$, to fully saturate the sandpack with water;
2. Excess water was displaced from the sand using a kerosene pre-flush (100 ml kerosene at a flow rate of 20 ml min$^{-1}$);
3. A dispersion of the SMPPO-based adhesive was passed through the sand (50 ml at a flow rate of 10 ml min$^{-1}$ or 100 ml at a flow rate of 20 ml min$^{-1}$);
4. Excess dispersion of the SMPPO-based adhesive was displaced from the sand using a kerosene post-flush (100 ml at a flow rate of 20 ml min$^{-1}$) so that the consolidated sand remained permeable; and
5. The treated sand was heated overnight (for at least 16 hours) at a temperature of 80° C. under kerosene.

Results

The results of the consolidation experiments are shown in Table 2 below and by reference to FIGS. 1 and 2.

TABLE 2

Consolidation Results

| Concentration of SMPPO-based adhesive in Kerosene (% wt) | Mass of treatment composition passed through 50 ml of sand (g) | Consolidation | Permeability |
| --- | --- | --- | --- |
| 50 | 50 | Very good | No |
| 25 | 50 | Good | Yes |
| 20 | 50 | Good | Yes |
| 15 | 50 | Good | Yes |
| 10 | 50 | Weak | Yes |
| 10 | 100 | Weak | Yes |
| 5 | 100 | Very weak | Yes |

It was found that all consolidated sand samples were flexible, with both sample stiffness and strength increasing with increasing concentration of adhesive in the treatment composition. It was also found that that the sand became blocked when a dispersion comprising 50% wt of adhesive was passed through the sandpack.

Figure 2:
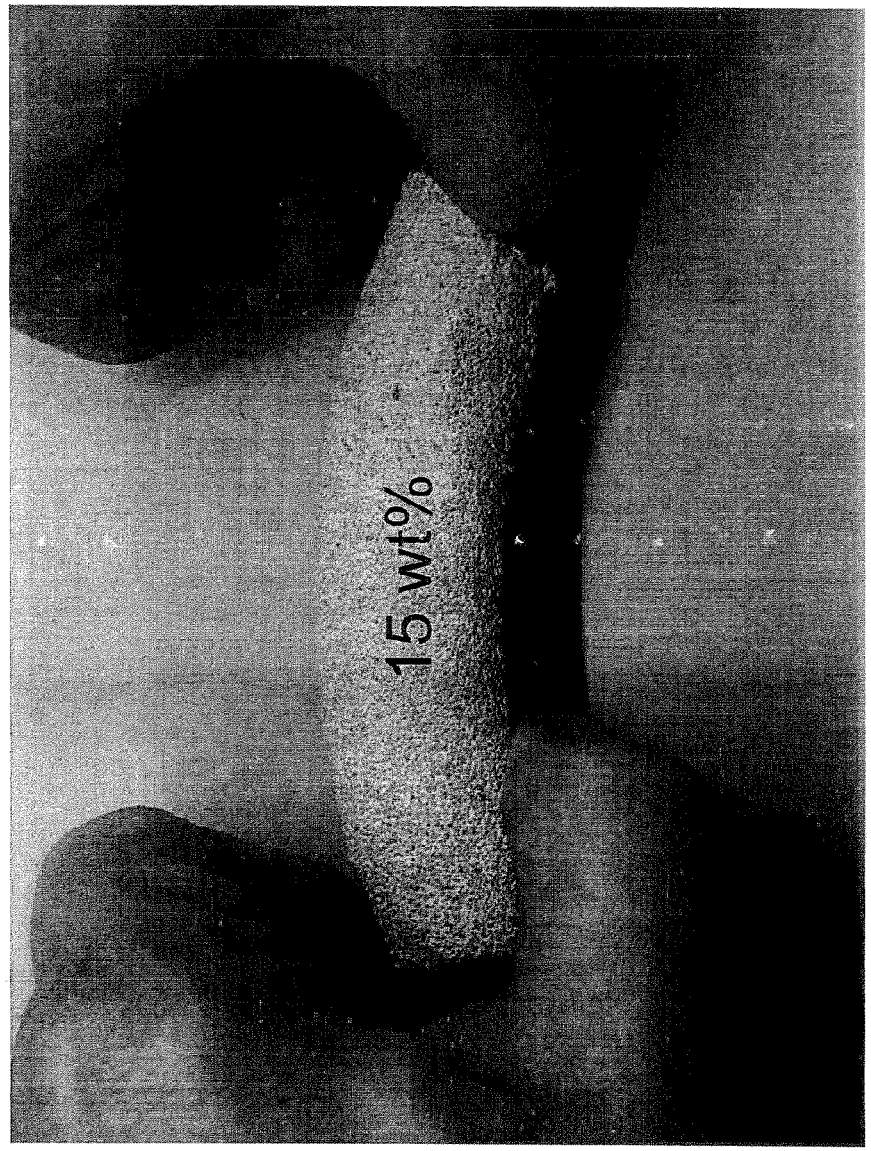
FIG. 2 shows the flexibility of the sand after being consolidated with a 15 wt % dispersion of the adhesive in kerosene.

Photographic images of the consolidated sand samples are shown in FIGS. 1 and 2. FIG. 1 illustrates consolidated sand that has been treated with 5% wt, 10% wt (50 g and 100 g), 15% wt, 20 wt % and 25 wt % dispersions of the adhesive in kerosene. FIG. 2 shows the flexibility of the sand after being consolidated with a 15 wt % dispersion of the adhesive in kerosene. Sample permeability was assessed qualitatively by observing the absorption of a blue dye solution and by blowing air through the sample.

Sand Consolidation Experiments 1 to 8: Using Kaneka MS Polymer S303H and Metatin™ Katalysator 740 Catalyst The formulations of treatment solutions employed in the following sand consolidation experiments are shown in Table 3 below.

TABLE 3

Treatment Solution Formulations (wt %)

| Component | Treatment based on 2.5 wt % S303H | Treatment based on 5 wt % S303H | Treatment based on 10 wt % S303H | Treatment based on 30 wt % S303H |
| --- | --- | --- | --- | --- |
| MS Polymer S303H | 2.50 | 5.00 | 10.0 | 30.0 |
| Dehydrating agent (VTMS) | 0.0625 | 0.125 | 0.250 | 0.750 |
| Catalyst (Metatin™ Katalysator 740) | 0.0417 | 0.0833 | 0.167 | 0.500 |
| Adhesion promoter (N-[3-(trimethoxysilyl)-propyl]ethylenediamine) | 0.0625 | 0.125 | 0.250 | 0.750 |
| Kerosene | 97.3 | 94.7 | 89.3 | 68.0 |

Experimental Procedure 1

The following steps were followed:
(i) the sand (50 ml; Garside 18/35 (coarse) silica sand) was placed in a 60 ml plastic syringe and saturated with artificial seawater;
(ii) the excess seawater was displaced using kerosene (100 ml) at a flow-rate of 20 ml min$^{-1}$;
(iii) the treatment solution (50 ml) was drawn through the sand using two different regimes (see Table 4 below);
(iv) excess treatment solution was removed with a further kerosene flush (100 ml at a flow rate of 20 ml
(v) the treated sand was heated under kerosene overnight (for approximately 16 hours) at a temperature of 60° C.; and
(vi) the consolidated sample was removed from the syringe and qualitatively assessed for permeability using the techniques described above.

The experimental results are given in Table 4 below.

Experimental Procedure 2

The following steps were followed:
(i) and (ii) were as for Experimental Procedure 1 above;
(iii) the treatment solution (50 ml) was allowed to drain through the sand under gravity (at a flow rate of approximately 15 ml min$^{-1}$) until the top surface of the liquid in the syringe was approximately 3 mm above the surface of the sand;
(iv) the syringe was then sealed and left overnight (approximately 16 hours) at either room temperature (approximately 20° C.) or a temperature of 60° C.; and
(vi) the consolidated sample was removed from the syringe and qualitatively assessed for permeability using the techniques described above.

The experimental results are given in Table 4 below.

Experimental Procedure 3

The following steps were followed:
(i) the sand (Garside No. 80 (fine) silica sand) was tightly packed (as a sand/deionised water slurry) into a cylindrical, stainless-steel pressure vessel having an internal diameter and length of 54 and 209 mm, respectively;
(ii) the sand was retained in the vessel using fine stainless-steel gauzes at each end of the vessel supported by threaded end fittings;
(iii) the sand was saturated with artificial seawater (2 liters);
(iv) the seawater was displaced using kerosene (2 liters) at a flow-rate of approximately 100 ml min$^{-1}$ (to give sand grains coated with a layer or sheath of irreducible water surrounded by a continuous oil (kerosene) phase);
(v) the permeability of the sand pack (when orientated horizontally) was determined by pumping kerosene (using high pressure liquid chromatography (HPLC) pumps) at a flow-rate of 200 ml min$^{-1}$ and measuring the pressure drop across the sand pack;
(vi) the sand pack was then turned through 90° to a vertical position and the treatment solution (150 ml) was injected into the bottom of the sand pack: the sandpack was then shut in overnight (for approximately 16 hours);
(vii) the effectiveness of the treatment solution at preventing sand production was assessed by pumping kerosene through the sandpack at up to a maximum flow rate of 200 ml min$^{-1}$ (as described below);
(viii) the permeability of the consolidated sand sample was calculated from the data obtained in the step (vii); and
(viii) the consolidated sample was removed from the vessel and its strength qualitatively assessed.

Figure 3:
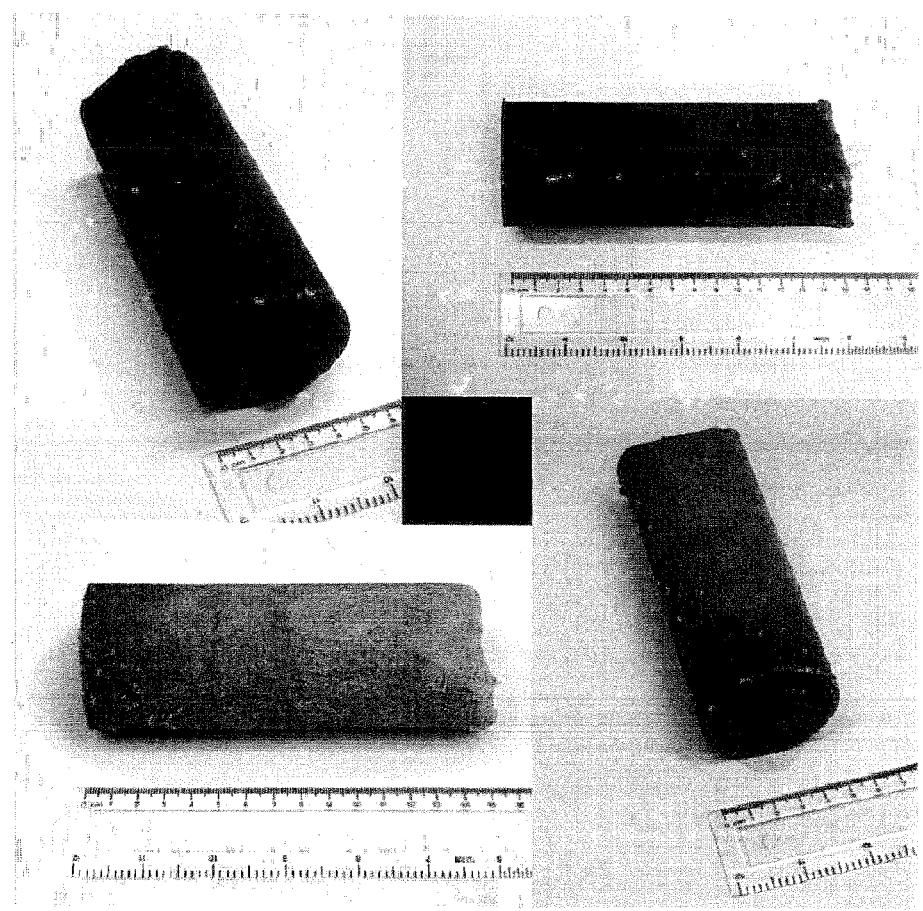
FIG. 3 shows images of consolidated sand samples.

The experimental results appear in Table 4 and images of the consolidated samples are given in FIG. 3.

TABLE 4

Sand Consolidation Results with Kaneka MS Polymer S303H

| Expt. No. | Experimental procedure used | Garside sand used | Concn. of Kaneka MS Polymer S303H in consolidation treatment (wt %) | Treatment regime | Curing temp. (° C.) | Consolidation |
|---|---|---|---|---|---|---|
| 1 | 1 | 18/25 mesh (coarse) | 30 | Treatment soln. allowed to drain under gravity through sand (~10 ml min$^{-1}$) | ~20 | Weak (brittle) |
| 2 | 1 | 18/25 mesh (coarse) | 30 | Treatment soln. allowed to drain under gravity through sand (~10 ml min$^{-1}$) for 4.75 min and then shut in for a further 5.25 min before allowing remainder to drain | ~20 | Good (flexible) |
| 3 | 2 | 18/25 mesh (coarse) | 2.5 | See above description of Procedure 2 | ~20 | Very weak (slightly flexible) |
| 4 | 2 | 18/25 mesh (coarse) | 5.0 | See above description of Procedure 2 | ~20 | Weak (slightly flexible) |
| 5 | 2 | 18/25 mesh (coarse) | 2.5 | See above description of Procedure 2 | 60 | Very weak (slightly flexible) |
| 6 | 2 | 18/25 mesh (coarse) | 5.0 | See above description of Procedure 2 | 60 | Weak (slightly flexible) |
| 7 | 3 | No. 80 (fine) | 5.0 | See above description of Procedure 3 | ~20 | Weak (slightly flexible) |
| 8 | 3 | No. 80 (fine) | 10 | See above description of Procedure 3 | ~20 | Weak (flexible) |

The results from Experiments 1 and 2 show that if the treatment solution is not in contact with the sand grains for a sufficient period of time, the resulting consolidated sample is weak and brittle. If the contact time is increased, stronger, flexible samples are obtained.

The results from Experiments 3 to 8 demonstrate that treatment solutions (containing up to 10 wt % Kaneka MS Polymer S303H) may be pumped into the sandpack, shut in for 16 hours, and then flushed out with kerosene without blocking the pore spaces. It is expected that this method could be used for treatments containing even higher concentrations of the SMPPO polymer.

Permeability Experiments

The permeability of Garside No. 80 (fine) sand was determined before and after consolidation with treatment solutions containing 5 and 10 wt % SMPPO (Kaneka MS Polymer S303H). Experimental Procedure 3 (see above) was used to consolidate the sand. The treatment formulations are given in Table 3 above. The permeability results are presented in Table 5 below.

TABLE 5

Permeability Results

| Wt % SMPPO in consolidation treatment | Permeability/Darcy (pressure drop across sand pack/bar) | | % Retention of permeability after consolidation |
|---|---|---|---|
| | Unconsolidated sand | Consolidated sample | |
| 5 | 11.1 (0.78) | 9.5 (0.92) | 85 |
| 10 | 11.1 (0.78) | 8.3 (1.05) | 75 |

Sample permeability was determined using a kerosene flow rate of 200 mil min$^{-1}$. To measure sand production as a function of flow rate from the consolidated sand samples, the stainless steel retaining gauze was removed from the outlet side of the core and replaced with a stainless steel disc containing a central 6 mm diameter hole. The disc (which was firmly secured against the sand pack) was used to increase the velocity of the pumped kerosene in the vicinity of the 6 mm "perforation" and so increase the likelihood of sand production. The kerosene flow rate was slowly increased from 0 to 200 ml min$^{-1}$ but no sand was produced up to the maximum flow-rate. In contrast, sand was produced at a flow-rate between 0 and 200 ml min$^{-1}$ when the experiment was repeated using an unconsolidated sand pack. The exact flow rate at which sand was first produced could not be determined as the sand that was washed out through the 6 mm "perforation" became trapped in the end cap of the apparatus and, thus, was not transferred into the collection sieve.

Sand Consolidation Experiments 9 to 14: Alternative Catalysts

A series of experiments were performed using different catalysts. The formulations of treatment solutions employed in the following sand consolidation experiments are shown in Table 6 below.

TABLE 6

Treatment Solution Formulations (wt %)

|  | Metatin™ Katalysator 470 (1) | Neodec. Acid (2) | Neodec. Acid + DEAPA (3) | NEOSTANN S-26 + lauryl-amine (4) | NEOSTANN U-28 + lauryl-amine (5) | NEOSTANN U-28 + DEAPA (6) |
|---|---|---|---|---|---|---|
| MS Polymer S303H | 30 | 30 | 30 | 30 | 30 | 30 |
| Adhesion promoter (N-(trimethoxysilyl)propyl ethylenediamine) | 0.75 | 1.5 | 1.5 | 0.75 | 0.9 | 0.9 |
| Metatin™ Katalysator 740 | 0.5 | — | — | — | — | — |
| Neodecanoic acid | — | 1.5 | 1.5 | — | — | — |
| DEAPA (3-diethylamin propylamine) | — | — | 0.15 | — | — | 0.225 |
| Dehydrating agent (vinyltrimethoxysilane, VTMS) | 0.75 | 0.15 | 0.15 | 0.75 | 0.09 | 0.09 |
| Matatin™ S26 | — | — | — | 0.5 | — | — |
| NEOSTANN U28 | — | — | — | — | 0.9 | 0.9 |
| Laurylamine | — | — | — | 0.05 | 0.225 | — |
| Kerosene | 68 | 66.85 | 66.7 | 67.95 | 67.88 | 67.88 |

Experimental Procedure 4

The experimental procedure is similar to Experimental Procedure 2 above. The following steps were followed:

(i) the sand (50 ml; Garside 16/30 (coarse) silica sand was placed in a 60 ml plastic syringe and saturated with artificial seawater;

(ii) the excess seawater was displaced using kerosene (100 ml) at a flow-rate of 20 ml min$^{-1}$;

(iii) the treatment solution (50 ml) was drawn through the sand at a flow-rate of 20 ml min$^{-1}$, until the top surface of the liquid in the syringe was approximately 5 mm above the surface of the sand;

(iv) the syringe was then sealed and left overnight (approximately 16 hours) at a temperature of 60° C.; and (v) the consolidated sample was removed from the syringe, strength and flexibility were assessed. The experimental results appear in Table 7.

TABLE 7

Results of sand consolidation with alternative treatment formulation

| Exp No. | Garside sand used | Formulation used | Curing temp (° C.) | Consolidation level |
|---|---|---|---|---|
| 9 | 16/30 | 1 | 60° C. | good (flexible) |
| 10 | 16/30 | 2 | 60° C. | good (flexible) |
| 11 | 16/30 | 3 | 60° C. | good (flexible) |
| 12 | 16/30 | 4 | 60° C. | good |
| 13 | 16/30 | 5 | 60° C. | good (flexible) |
| 14 | 16/30 | 6 | 60° C. | good (flexible) |

These results show that a number of different catalysts can be used.

Sand Consolidation Experiments 15 to 24: Alternative Treatment Formulation

A series of experiments were performed using different polymers and Ti-based catalysts. The formulations of treatment solutions employed in the following sand consolidation experiments are shown in Table 8 below.

TABLE 8

Treatment Solution Formulations (wt %)

|  |  | (7) | (8) | (9) | (10) | (11) | (12) |
|---|---|---|---|---|---|---|---|
| Polymer | SAX 520 | 5 | 30 |  |  | 5 | 30 |
|  | SAX 580 |  |  | 5 | 30 |  |  |
| Adhesion promoter 3-(Glycidoxypropyl) trimethoxysilane |  |  |  | 0.125 | 0.75 |  |  |
| Dehydrating agent (vinyltrimethoxysilane, VTMS) |  | 0.125 | 0.75 | 0.125 | 0.75 | 0.125 | 0.75 |
| Catalyst | Tyzor PITA | 0.25 | 1.5 | 0.35 | 2.1 |  |  |
|  | Tyzor Tot |  |  |  |  | 0.25 | 1.5 |
| Kerosene |  | 94.6 | 67.7 | 94.4 | 66.4 | 94.6 | 67.75 |

Experimental Procedure 5.

The experimental procedure is identical to Experimental Procedure 4 above, except that some experiments were performed with Garside No. 80 (fine) silica, and some experiments were left overnight (cured) at room temperature (approximately 20° C.), rather than 60° C.

The experimental results appear in Table 9.

TABLE 9

Results of sand consolidation with alternative treatment formulation

| Exp No. | Garside sand used | Formulation used | Curing temp. (° C.) | Consolidation level |
|---|---|---|---|---|
| 15 | Garside No. 80 | 7 | 20° C. | good (flexible) |
| 16 | 16/30 | 8 | 20° C. | good (flexible) |
| 17 | Garside No. 80 | 7 | 60° C. | good (flexible) |
| 18 | 16/30 | 8 | 60° C. | good (flexible) |
| 19 | Garside No. 80 | 9 | 20° C. | good (flexible) |
| 20 | 16/30 | 10 | 20° C. | good (flexible) |
| 21 | Garside No. 80 | 9 | 60° C. | good (flexible) |

TABLE 9-continued

Results of sand consolidation with alternative treatment formulation

| Exp No. | Garside sand used | Formulation used | Curing temp. (° C.) | Consolidation level |
|---|---|---|---|---|
| 22 | 16/30 | 10 | 60° C. | good (flexible) |
| 23 | Garside No. 80 | 11 | 20° C. | good |
| 24 | 16/30 | 12 | 20° C. | good |

Sand Consolidation Experiments 25 to 28: Further Alternative Treatment Formulation A further series of experiments were performed using a different polymer (SAX260) and a dioctyltin-based catalyst (NEOSTANN S-1). The formulations of treatment solutions employed in the following sand consolidation experiments are shown in Table 10 below:

TABLE 10

Treatment solution formulations (wt %)

|  | (13) | (14) |
|---|---|---|
| Polymer - SAX 260 | 30 | 5 |
| Adhesion promoter (N-[3-(trimethoxysilyl)propyl]-ethylenediamine, tech., 80+%, ex. Aldrich) | 0.75 | 0.125 |
| NEOSTANN S-1 | 0.5 | 0.0833 |
| Dehydrating agent (vinyltrimethoxysilane, VTMS, 98%, ex. Aldrich) | 0.75 | 0.125 |
| Kerosene (Clairsol 370, ex. Petrochem Carless) | 68 | 94.7 |

The experimental procedure used was identical to Experimental Procedure 5 described previously. The experimental results appear in Table 11.

TABLE 11

Results of sand consolidation with NEOSTANN S-1

| Exp No. | Garside sand used | Formulation used | Curing temp. (° C.) | Consolidation level |
|---|---|---|---|---|
| 25 | 16/30 | 13 | 60° C. | good (flexible) |
| 26 | 16/30 | 13 | 21° C. | good (flexible) |
| 27 | Garside No. 80 | 14 | 60° C. | good (flexible) |
| 28 | Garside No. 80 | 14 | 21° C. | good (flexible) |

The invention claimed is:

1. A method of treating a subterranean hydrocarbon-bearing formation comprising unconsolidated or poorly consolidated particulates to produce a consolidated formation, the method comprising contacting the formation with a solution or a dispersion of an organosilane, wherein the organosilane is a silylated polymer of formula (I):

$$(RO)_{3-n}R_nSi-A-B-A-Si(OR)_{3-n}R_n \quad (I)$$
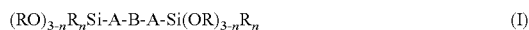

wherein each R is independently a substituted or unsubstituted, alkyl group having from 1 to 6 carbon atoms, or a —C(O)R group where R is as hereinbefore defined;
n is 0, 1 or 2;
each A is a divalent organic radical; and
B is a poly(oxyalkylene) linking group, a polyurethane linking group, or a poly(meth)acrylate linking group wherein the poly(oxyalkylene) linking group or the polyurethane linking group has a number average molar mass in the range of 600 to 20,000 g mol$^{-1}$ and the poly(meth)acrylate linking group has a number average molar mass in the range of 600 to 40,000 g mol$^{-1}$,
whereby
the residual matrix strength of the particulates is increased and their migration from the formation is reduced or prevented,
the consolidation formation is flexible, and
the consolidation formation maintains its permeability.

2. A method as claimed in claim 1 wherein the formation is contacted with a treatment composition comprising a solution or dispersion of the organosilane in an organic carrier fluid.

3. A method as claimed in claim 2 wherein the organic carrier fluid is selected from oils such as crude oil or base oil; aliphatic hydrocarbon; aromatic hydrocarbons and petroleum distillate fractions.

4. A method as claimed in claim 2 wherein the treatment composition comprises a dehydrating agent.

5. A method as claimed in claim 2 wherein the treatment composition comprises an adhesion promoter that is an aminoorganosilane of formula (VI):

$$(RO)_{3-n}R_nSi-R^9-NR^{10}R^{11} \quad (VI)$$

wherein R and n are as previously defined for formula (I); R$^9$ is selected from —(CH$_2$)$_x$— where x is an integer of from 1 to 20, or is —(CH$_2$)$_y$NH(CH$_2$)$_z$— where y is an integer of from 1 to 10, and z is an integer of from 1 to 10, and R$^{10}$ and R$^{11}$ are independently selected from hydrogen and a substituted or unsubstituted alkyl group having from 1 to 6 carbon atoms.

6. A method a claimed in claim 5 wherein the aminoorganosilane of formula (VI) is selected from N-(n-butyl)-3-aminopropyltrimethoxysilane, N-(2-aminoethyl)-3-aminopropyltrimethoxysilane, N-(2-aminoethyl)-3-aminopropylmethyldimethoxysilane, and 3-aminopropylmethyldiethoxysilane, 3-aminopropyltriethoxysilane, and 3-aminopropyltrimethoxysilane.

7. A method as claimed in claim 5 wherein the concentration of the adhesion promoter of formula (VI) in the carrier fluid of the treatment composition is in the range 0.05 to 5 wt %.

8. A method as claimed in claim 2 wherein the treatment composition comprises a catalyst selected from organotin catalysts, inorganic tin catalysts, organic acids, organic acid metal salts, amine compounds, Group 3B or Group 4A metal compounds and combinations thereof.

9. A method as claimed in claim 8, wherein the catalyst comprises a dialkyltin compound.

10. A method as claimed in claim 9, wherein the catalyst is selected from a dialkyltin diacetylacetonate, a dialkyltin dilaurate, a dialkyltin diketonate and a catalyst which consists of the silicic acid, tetraethylester reaction products with bis (acetyloxy)dioctylstannane.

11. A method as claimed in claim 8, wherein the catalyst comprises an organic carboxylic acid.

12. A method as claimed in claim 11, wherein the carboxylic acid is selected from acetic acid, oxalic acid, butyric acid, tartaric acid, maleic acid, octylic acid, neodecanoic acid and oleic acid.

13. A method as claimed in claim 8, wherein the catalyst comprises an organotitanate compound.

14. A method as claimed in claim 2 wherein the concentration of organosilane of formula (I) in the organic carrier fluid of the treatment composition is in the range of from 0.1 to 50% wt.

15. A method as claimed in claim 2 wherein the formation contains excess water and an organic pre-flush fluid is injected into the formation before the treatment composition.

16. A method as claimed in claim 15 wherein the organic pre-flush fluid is selected from crude oil, base oil, aliphatic hydrocarbons, aromatic hydrocarbons or petroleum distillation products.

17. A method as claimed in claim 15 wherein
   (a) the pre-flush fluid is injected into the formation via a production well or an injection well;
   (b) a sufficient volume of the treatment composition is injected into the formation via the production well or injection well to consolidate the near wellbore region of the formation;
   (c) the well is shut-in for a period of time of 1 to 24 hours for the organosilane of formula (I) to hydrolyse and consolidate the particles of the formation.

18. A method as claimed in claim 17 wherein the well is shut-in for 2 to 10 hours.

19. A method as claimed in claim 17 wherein (d) a post-flush fluid is injected into the formation.

20. A method a claimed in claim 2 wherein the formation is oil wet and a first, second and third pre-flush fluid are sequentially injected into the formation prior to injecting the treatment composition into the formation wherein the first pre-flush fluid is a mutual solvent for water and oil, the second pre-flush fluid is a brine and the third pre-flush fluid is an organic fluid.

21. A method as claimed in claim 2 wherein an organic post-flush fluid is injected into the formation after injection of the treatment composition.

22. A method as claimed in claim 21 wherein the organic post-flush fluid is selected from crude oil, base oil, aliphatic hydrocarbons, aromatic hydrocarbons or petroleum distribution products.

23. A method as claimed in claim 1 wherein the polymeric linking group, B, of the organosilane compound of formula (I) is a poly(oxyalkylene) homopolymer or a poly(oxyalkylene) copolymer selected from the group consisting of poly(oxyethylene) homopolymers, poly(oxypropylene) homopolymers, poly(oxytetramethylene) homopolymers, copolymers of ethylene oxide and propylene oxide, copolymers of ethylene oxide and butylene oxide, copolymers of ethylene oxide and propylene oxide, copolymers of ethylene oxide and butylene oxide, copolymers of propylene oxide and butylene oxide, and copolymers of ethylene oxide, propylene oxide and butylene oxide.

24. A method as claimed in claim 1 wherein the polymeric linking group, B, of the organosilane compound of formula (I) is a linear polyacrylate polymer that is derived from at least one monomer of formula $CH_2=CHC(G)OR^6$ where $R^6$ is selected from methyl, ethyl, n-propyl, isopropyl, n-butyl, isobutyl, and tert-butyl.

25. A method as claimed in claim 1 wherein the formation comprises greater than 85% sand.

* * * * *